United States Patent [19]

Hunter et al.

[11] 3,829,546
[45] Aug. 13, 1974

[54] SEALING OF MOLDED BUSHINGS

[75] Inventors: Richard F. Hunter; Gerhard O. Mietz, both of Hickory, N.C.

[73] Assignee: General Electric Company

[22] Filed: Nov. 22, 1972

[21] Appl. No.: 308,735

[52] U.S. Cl..................... 264/262, 117/75, 117/79, 117/218, 174/77 R, 174/152 R, 264/263
[51] Int. Cl. .......................................... H01b 17/30
[58] Field of Search............. 174/23 R, 50.62, 52 S, 174/76, 77 R, 151, 152 R, 153 R; 339/218 R, 218 M; 117/75, 79, 218; 264/262, 263

[56] References Cited
UNITED STATES PATENTS

| | | | |
|---|---|---|---|
| 3,125,709 | 3/1964 | Wagner ........................ | 174/52 S X |
| 3,388,212 | 6/1968 | Nichols et al. .................. | 174/153 R |
| 3,663,928 | 5/1972 | Keto et al. ................ | 174/152 R UX |

FOREIGN PATENTS OR APPLICATIONS 961,770  6/1964  Great Britain .................. 174/152 R

*Primary Examiner*—Laramie E. Askin
*Attorney, Agent, or Firm*—Francis X. Doyle; John J. Kelleher; Volker R. Ulbrich

[57] ABSTRACT

A method of sealing a molded bushing to prevent leaking. The metal conductor area just beyond the edge of the bushing is coated with an elastomeric material. The coated area is then covered with a resinous material such as a thermosetting epoxy resin, which adheres to the bushing, the conductor, and the elastomeric material. Both the thermosetting material and the elastomeric material are then cured to provide a water-tight seal between the end of the bushing and the electrical conductor.

3 Claims, 3 Drawing Figures

PATENTED AUG 13 1974  3,829,546

SEALING OF MOLDED BUSHINGS

BACKGROUND OF THE INVENTION

This invention relates to molded bushings which are molded directly into a molded electrical apparatus, and more particularly to a method of sealing the electrical conductor in such bushing to prevent leakage between such bushing and such conductor.

In recent years much interest has been shown in underground installation of electrical apparatus, mostly with reference to electrical distribution apparatus, such as distribution transformers. However, when steel tank transformers are buried in the ground, they are subject to corrosion due to the adverse conditions of the underground environment. To prevent such corrosion, various coatings have been applied to the outer surface of the steel tank. Also, in many instances, cathodic protection has been provided. Recently, attempts have been made to provide molded plastic tanks since such tanks are not subject to attack by corrosive conditions of the underground environment. One such tank, including a metal liner to prevent moisture diffusion, is described and claimed in application, Ser. No. 291,728 filed Sept. 25, 1972, for Composite Electrical Transformer Housing, in the name of Richard F. Hunter et al. In the housing of such plastic tank as is disclosed in the application, the high and low voltage conductors are molded in place in bushings which are formed integrally with the housing or its cover. While such housing has been found adequate for underground use, under some circumstances of high moisture environment, leakage has developed around the conductors which are molded into the integral bushing. This invention provides the method of sealing such conductors to the bushings to prevent such leakage.

It is, therefore, one object of this invention to provide a novel means for sealing an electrical conductor to a molded plastic bushing.

A still further object of this invention is to provide a leak-tight seal between an electrical conductor and a plastic bushing containing such conductor.

Yet another object of this invention is to provide a leak-tight seal for a molded plastic bushing and an electrical conductor which is molded into such bushing.

SUMMARY OF THE INVENTION

In a preferred form of this invention, a seal is provided at the end of a plastic molded bushing and a conductor molded in such bushing. The preferred seal comprises an elastomeric material which is coated on the portion of the conductor that extends beyond the molded bushing. An epoxy resin is then applied over the coated portion of the conductor and the end of the bushing adjacent thereto. The elastomeric material and the epoxy resin are then cured together to form a water-tight seal between the conductor and the end of the plastic bushing.

The invention which is sought to be protected will be particularly pointed out and distinctly claimed in the claims which are appended hereto. However, it is believed that this invention and the manner in which its various objects and advantages are obtained, as well as other objects and advantages thereof, will be better understood by reference to the following detailed description, particularly when considered in the light of the accompanying drawing.

DETAILED DESCRIPTION OF PREFERRED EMBODIMENTS

Figure 1:
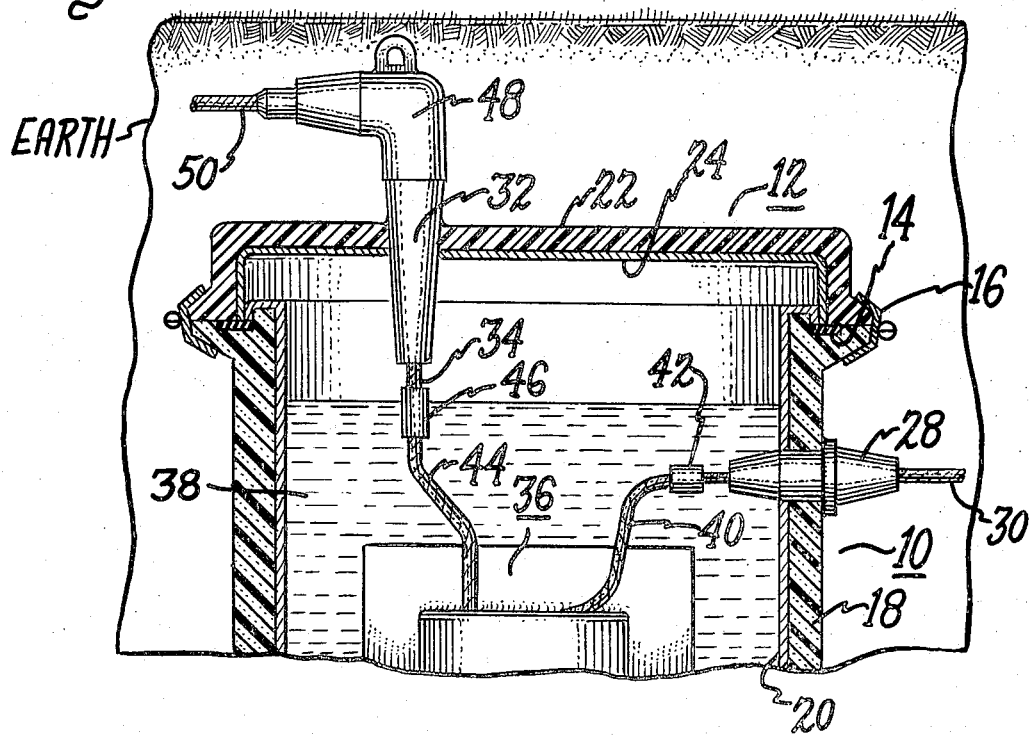
FIG. 1 is a sectional view of a portion of a plastic transformer housing showing the molded bushings which are the subject of this invention.

As previously noted, this invention relates to molded bushings, and particularly to a method of providing a water-tight seal between such bushings and a conductor molded into the bushing. The invention will be described with reference to the drawing in which like numerals are used to indicate like parts throughout the various views.

Referring first to FIG. 1, there is shown in section a partial view of a plastic molded transformer housing such as is described and claimed in the aforementioned application, Ser. No. 291,728. As is shown in FIG. 1, the housing comprises a tank 10 and a cover 12, hermetically sealed together by gasket 14 and clamping ring 16. The tank 10 comprises a plastic body 18 and a metal liner 20 while the cover 12 is formed by plastic member 22 and metal liner 24.

Integrally molded in the side wall of tank 10 is a plastic bushing 28 with an electrical conductor 30 molded into the bushing 28. A second bushing 32 is shown integrally molded in the cover 12 with electrical conductor 34 molded into the bushing 32. Of course, it will be understood that bushings 28 and 32 could be integrally molded into the cover or into the side wall as desired, it only being required that the bushings be integrally molded with the plastic material and that the conductors 30 and 34 be molded into such bushings. A core and coil unit 36 is shown in tank 10 covered by an electrical insulating liquid 38. A lead 40 extends from core and coil unit 36 to conductor 30 and is electrically connected thereto by clamping means 42. In a similar manner, lead 44 extends from core and coil unit 36 to conductor 34 and is electrically connected thereto by clamping means 46. The core and coil unit 36 is connected to a source of electrical energy (not shown) through an elbow termination 48 which is connected to a high voltage cable 50. As will be understood, conductor 30 will be connected to an electrical load (not shown) to be served by the transformer.

Figure 2:
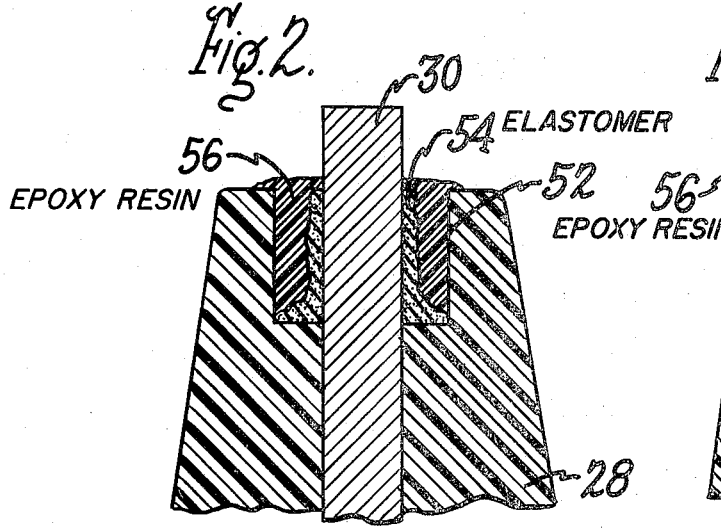
FIG. 2 is a sectional view of a portion of a molded bushing showing one form of sealing means according to this invention.

Under some circumstances, moisture can leak into the transformer between the electrical conductors 30 and 34 and the molded bushings 28 and 32. FIG. 2 shows one means of providing a water-tight seal between the conductors 30 and 34 and their respective bushings 28 and 32. This embodiment of the invention will be described with specific reference to bushing 29 and conductor 30. However, it will be understood that such description applies equally well to bushing 32 and conductor 34 and to any other molded bushing and its conductor. As shown in FIG. 2, a well 52 is formed in one end of bushing 28. In the preferred form of the invention, the well 52 is formed in the end of bushing 28, which is within the tank 10. An elastomeric material 54 is coated on the end of conductor 30 within well 52 and also on the portion of bushing 28 at the base of well 52 as is shown. An epoxy material 56 is then poured into the well 52 completely filling such well. The epoxy material is then cured, at the same time curing the elastomeric material 54. This forms a water-tight seal between the bushing 28 and the conductor 30.

Figure 3:
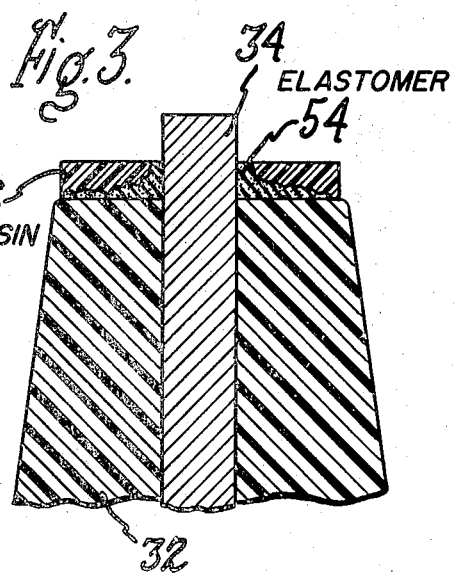
FIG. 3 is a sectional view of a portion of a molded bushing showing another form of sealing means according to a further embodiment of this invention.

A second embodiment of the invention is shown in FIG. 3, which will be described with reference to bushing 32 and conductor 34. In FIG. 3, the end of conductor 34, extending beyond the end of bushing 32 is shown as being coated with an elastomeric material 54. Elastomeric material 54 also coats a portion of the end of bushing 32 as shown. An epoxy material 56 is then placed over the elastomer 54 completely covering the elastomer 54 and contacting conductor 34 and bushing 32. The epoxy material 56 is then cured which also cures the elastomeric material 54. This provides a complete seal of the joint between the conductor 34 and the bushing 32.

In the preferred embodiment of this invention, the elastomeric material is a polysulfide rubber material. The particular polysulfide rubber used is known as Magi Seal 425 and is obtained from the Magi Chemical Company. The epoxy material used is provided by the Shell Chemical Company under the tradename Epon 826. As presently practiced, the polysulfide rubber is coated on the conductor and the bushing, then the epoxy material is put over the rubber contacting both the conductor and the bushing. The polysulfide rubber and the epoxy used have approximately the same curing time and temperature. Thus, in the preferred embodiment, the elastomeric rubber and the thermosetting epoxy are both cured together at approximately 140° F. for approximately one hour.

Of course, it will be understood that the elastomeric material could be cured prior to the application of the epoxy material. However, that would add a further step to the process so, as set forth, the preferred method is to cure both the elastomer and the epoxy together.

While this invention has been described with reference to a preferred embodiment, it will, of course, be understood that this is by way of illustration and not limitation. Therefore, the invention is to be considered as to both spirit and scope in the manner set forth in the appended claims.

What is claimed as new and which it is desired to secure by Letters Patent of the United States is:

1. The method of providing a water-tight seal between a molded bushing and a conductor molded in said bushing, said conductor having a portion extending beyond an end of said bushing, comprising:
   a. coating the portion of said conductor extending beyond an end of said bushing and also coating said bushing end with an uncured elastomeric material,
   b. completely covering said elastomeric material with an uncured epoxy resin, said epoxy resin contacting said conductor and said bushing, and
   c. curing said elastomeric material and said epoxy resin to seal the joint between said conductor and said bushing.

2. The method of providing a water-tight seal between a molded bushing and a conductor molded in said bushing as set forth in claim 1 and further comprising forming a well in the end of said bushing, coating said conductor and a portion of said bushing within said well with said uncured elastomeric material, and filling said well with said uncured epoxy material.

3. The method of providing a water-tight seal between a molded bushing and a conductor molded in said bushing as set forth in claim 1 in which the curing of said elastomeric material and said epoxy resin is carried out at a temperature of approximately 140° F. for approximately one hour.

* * * * *